May 16, 1933.  E. J. FARKAS  1,908,742
OVERRUNNING CLUTCH
Filed May 28, 1931   3 Sheets-Sheet 1
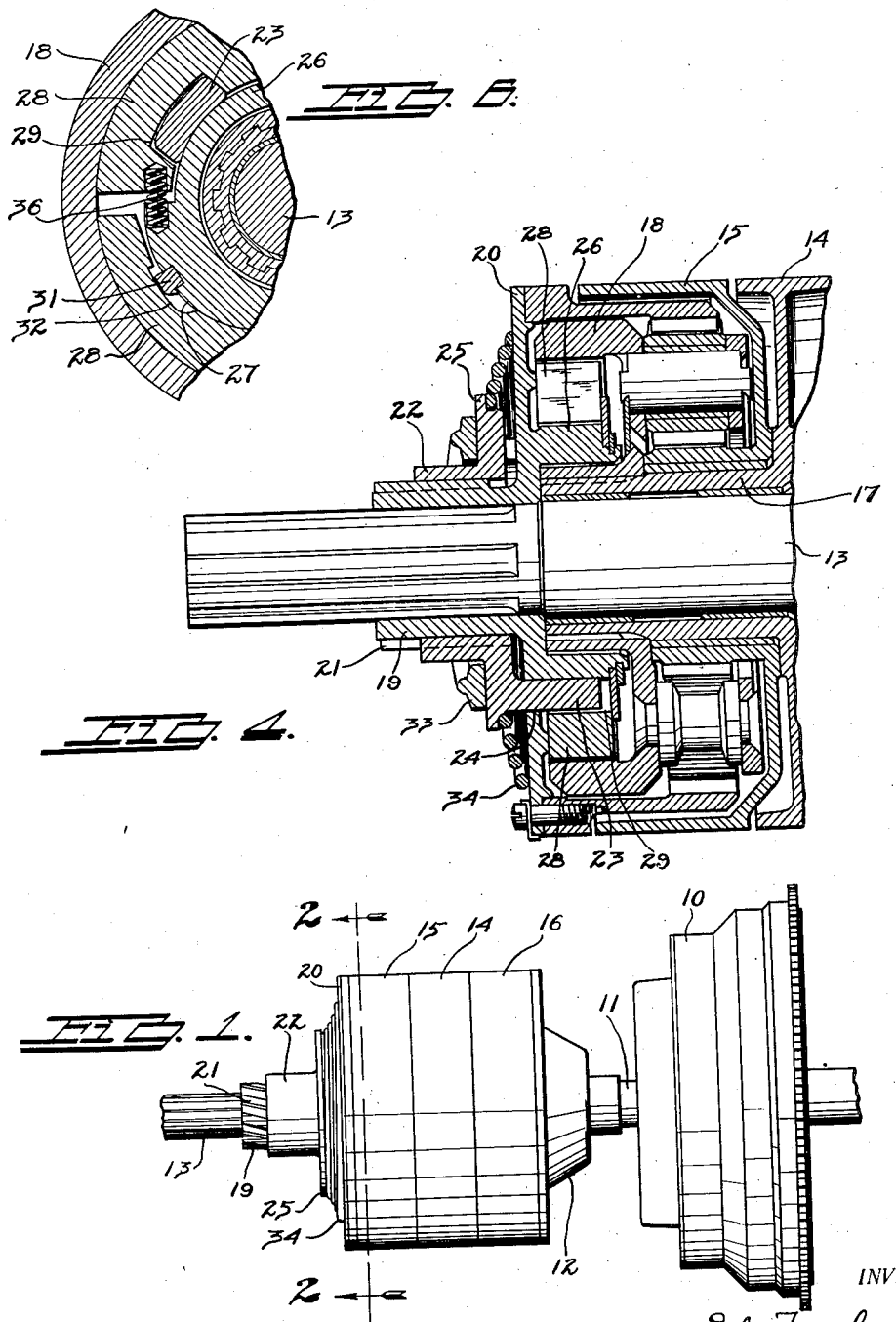
INVENTOR.
BY E. J. Farkas
ATTORNEY.

May 16, 1933.  E. J. FARKAS  1,908,742
OVERRUNNING CLUTCH
Filed May 28, 1931   3 Sheets-Sheet 2
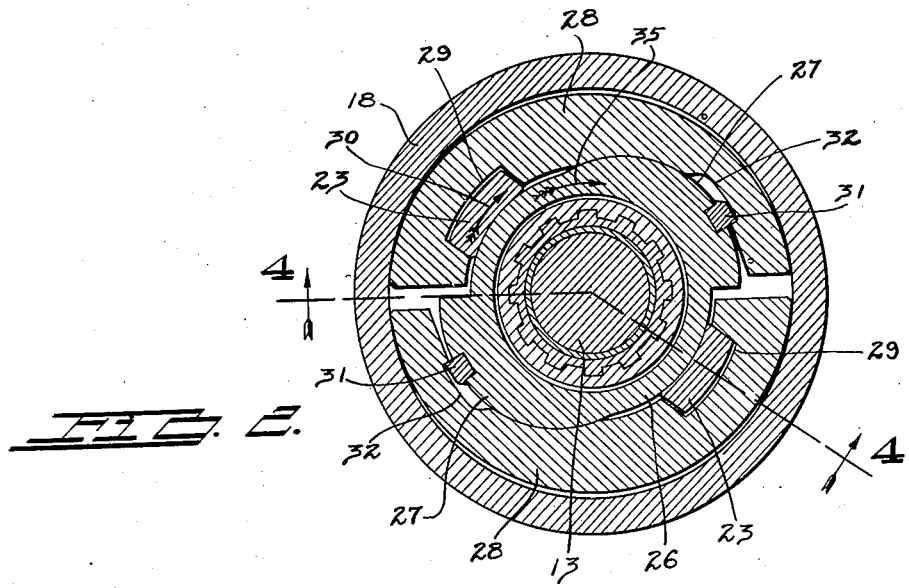
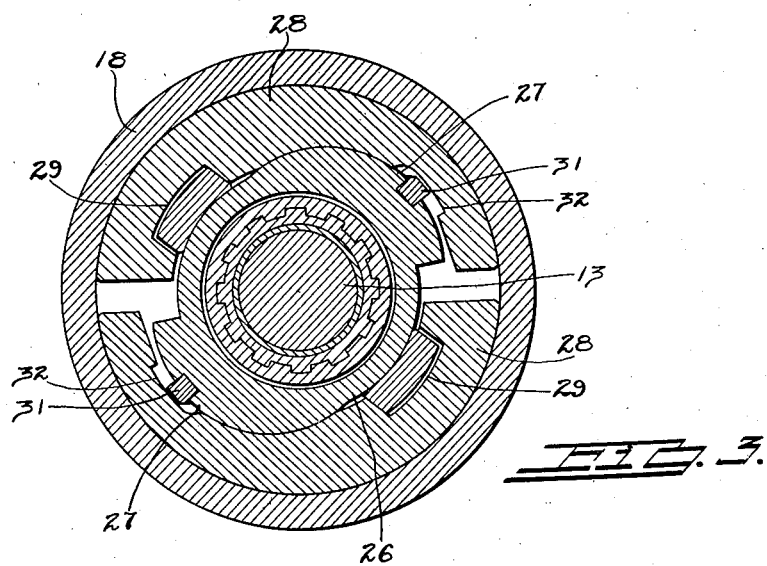
INVENTOR.
E. J. Farkas.
BY
ATTORNEY.

May 16, 1933.  E. J. FARKAS  1,908,742
OVERRUNNING CLUTCH
Filed May 28, 1931  3 Sheets-Sheet 3
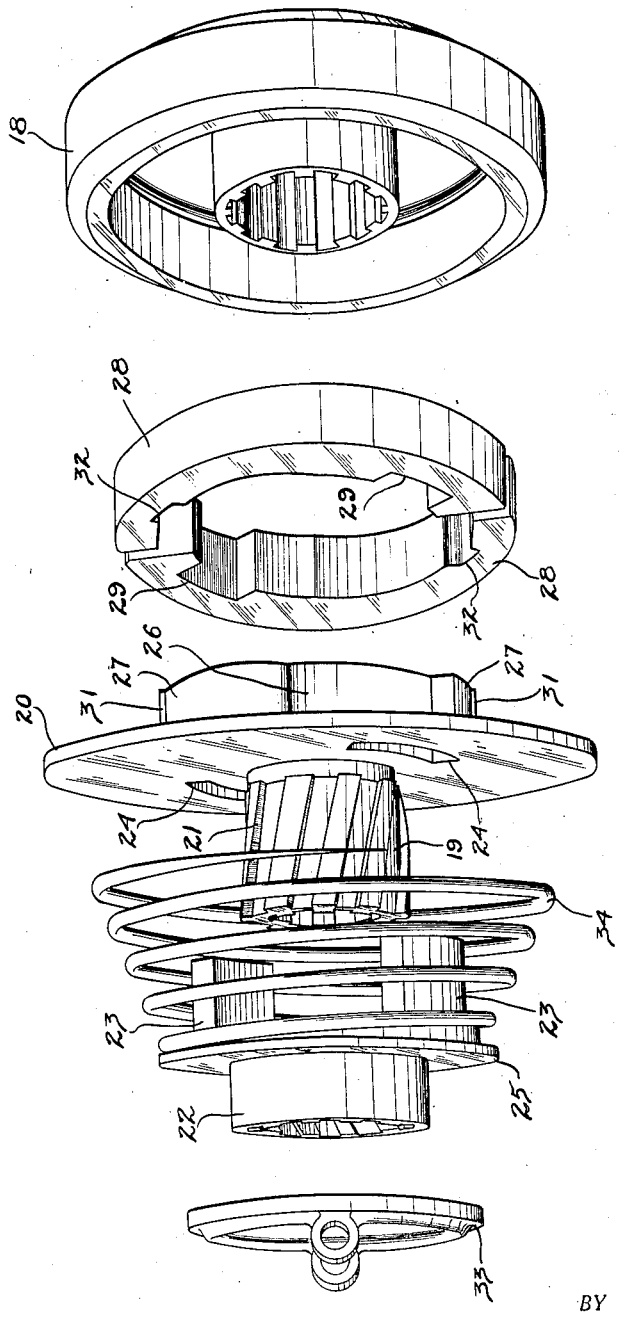
INVENTOR.
E. J. Farkas
BY
ATTORNEY.

Patented May 16, 1933

1,908,742

UNITED STATES PATENT OFFICE

EUGENE J. FARKAS, OF DETROIT, MICHIGAN, ASSIGNOR TO FORD MOTOR COMPANY, OF DEARBORN, MICHIGAN, A CORPORATION OF DELAWARE

OVERRUNNING CLUTCH

Application filed May 28, 1931. Serial No. 540,694.

A further object of my invention is to provide a transmission having a novel type of overrunning clutch mechanism therein wherein an overrunning drive will be obtained to drive the vehicle in high gear, the driving wheels of the vehicle being allowed to overrun the engine to obtain what is known as "free-wheeling". This device is particularly suitable for use in connection with planetary transmissions wherein several sets of epicycloidal or planetary gear units are provided, each unit of which is provided with a brake drum adapted to be held from rotation to affect one of the reduced speeds of the transmission. My improved overrunning clutch may be connected between either the engine driving shaft and one of these gear units or between any two of these gear units, as invariably in neutral position the rotating elements thereof rotate at different speeds so that the clutching of any two units together will lock the gearing whereby all of the units will rotate together so that the direct drive is obtained. Heretofore, it has been customary to provide a friction clutch for this direct drive, and in most structures a multiple disc clutch, which multiple disc clutch is not only expensive to produce but, of course, operates in both directions so that free-wheeling is not obtained therewith. With my improved type of clutch one of the two members clutched together is free to overrun the other so that free-wheeling is obtained in the direct drive speed.

Although overrunning clutches connected to the rear of transmissions are known to be old, it is still believed novel to incorporate such a device in a planetary transmission for effecting the direct drive and at the same time providing free-wheeling for the vehicle without the addition of a single part.

Still further, my overrunning clutch has the desirable characteristic that its engagement is gradual, in contrast to the ordinary roller type overrunning clutch in which a wedging action between the rollers and cam faces is used to convey the drive. My overrunning clutch is of the shoe type, comprising a pair of arcuate shaped friction shoes which are forced by a cam into engagement with an annular friction drum to effectively clutch the drum and cam together.

A further important feature of this device is the novel means whereby the friction shoes are positively drawn out of engagement with the friction drum when the engine clutch is released to thereby prevent sticking and undue wear when the engine is operating in neutral drive.

With these and other objects in view, my invention consists in the arrangement, construction, and combination of the various parts of my improved device, as described in the specification, claimed in my claims, and illustrated in the accompanying drawings, in which:

Figure 1 shows a side elevation of a planetary transmission unit having my improved overrunning clutch incorporated therein.

Figure 2 shows a sectional view taken on the line 2—2 of Figure 1, illustrating the several parts of my clutch mechanism when in their released positions.

Figure 3 shows a sectional view, similar to Figure 2, illustrating the several parts when in their engaged positions.

Figure 4 shows a sectional view taken on the line 4—4 of Figure 2.

Figure 5 is a perspective view of the several parts of my clutch shown in position ready to assemble, whereby the construction of the various parts and the action therebetween is better illustrated, and Figure 6 shows a sectional view, similar to Figure 3, of an alternate structure in which the friction shoe applying springs act between the cams and the shoes.

Referring to the accompanying drawings, I have used the reference numeral 10 to indicate generally an engine fly wheel usually associated with an automobile engine and from which a clutch drive shaft 11 extends. The rear end of the shaft 11 is connected to a transmission unit 12 in the usual way. The detail construction of this transmission unit will be disclosed only so far as it cooperates with my clutch as it forms no part of my invention and as any type of planetary transmission or for certain purposes even a sliding gear transmission may be used herewith. It is thought sufficient to say that the transmission 12 is provided with a driven shaft 13 which is connected to the vehicle driving wheels through the conventional running gear mechanism, the torque of which driven shaft is increased by the selective holding from rotation of three annular brake drums 14, 15 and 16, respectively.

The details of the epicycloidal gearing in the transmission will not be described, it being sufficient to say that when the brake drum 16 is held from rotation a reduced speed in reverse direction is transmitted through the driven shaft 13, and in like manner when the drum 14 is held from rotation a low forward speed is impressed in the shaft 13, and similarly holding the drum 15 produces an intermediate speed drive in the shaft 13. Each of these three reduced speed drives is positive in action in both directions so that whenever one of these drives is engaged the engine may be used as a brake. In order to effect the direct or high gear drive, I have arranged to clutch the driven shaft 13 with one of the reduced speed effecting drums to thereby compel the transmission gearing to rotate as a unit.

Rotatably mounted upon the driven shaft 13, I have provided a hub 17 which forms the hub of the low speed drum 14, the rear end of which is secured to a friction drum 18 by suitable splines. The web of the drum 18 also serves as a planet carrier for a portion of the intermediate speed gearing, however, this arrangement is solely for convenience, the gearing forming no part of the invention herein. Just rearwardly of the hub 17, I have provided a sleeve 19 which is keyed to the shaft 13 from the forward end of which a radial flange 20 extends. The sleeve 19 is provided with a spiral splined portion 21 upon which a correspondingly splined clutch operating sleeve 22 is reciprocally mounted, whereby longitudinal reciprocation of the sleeve 22 causes a limited relative rotation between the sleeves 19 and 22. A radial flange 25 extends from the forward end of the sleeve 22 and a pair of diametrically opposed arms 23 formed integrally with the periphery of the flange 25 projects through suitable slots 24 in the flange 20 so that the above mentioned relative rotation causes the arms 23 to oscillate in the slots 24. A cam ring 26 is formed integrally with the flange 20 and is so proportioned that the arms 23 oscillate adjacent to the periphery of this ring. The cam ring is provided with a pair of diametrically opposed cams 27 formed integrally therewith, the cams 27, and ring 26, being in the plane of the drum 18.

It will readily be seen that the friction drum 18 being secured to the hub 17 and the cam ring 26 being fastened to the shaft 13, that clutching the cam ring and friction drum together will clutch the hub 17 to the shaft 13. The shaft 13 is directly connected to the planet carrier of the low, and reverse speed gearing, by means not shown in the drawings whereby the holding of either the low speed drum 14 or reverse speed drum while the device is in operation transmits a reduced speed drive through the planet carrier to the shaft 13. Consequently, if either of these reduced speed drums is locked to the shaft 13, the gearing cannot function so that the gearing, drums and shaft rotate as a unit, thereby providing a direct or 1 to 1 ratio drive through the transmission. In order to effect this action I have provided a pair of arcuate shaped shoes 28 with the friction drum, the peripheries of each of which are machined to an arc having a slightly greater radius than the curvature of the friction drum 18 so that a small clearance is normally obtained between the intermediate portions of the friction shoes and the friction drum. Each of the shoes 28 is provided with a cam surface in an end which co-acts with one of the cams 27, whereby relative rotation in one direction between the cam ring 26 and the shoes 28 causes the shoes to wedge into engagement with the friction drum 18.

Referring to Figure 2, it will be seen that each of the shoes 28 is machined as a semi-circular ring with a portion adjacent to one end removed to make room for the cams 27 so that the portions of the shoes between the cams and the friction drum are substantially wedge shaped. The opposite or thick end of each of the shoes is provided with a transverse slot 29 into which the arms 23 are mounted so that relative rotation between the arms 23 and cam ring 26 causes the shoes 28 to move against the cams 27 thereby wedging the shoes into engagement with the friction drum. Relative rotation of the arms 23 in the direction shown by the arrow 30 causes the engagement of the friction shoes 28, and inversely, when the arms 23 are rotated in the direction opposite to the arrow 30, then the shoes 28 will be drawn away from the cams 27 thereby disengaging the shoes from the friction drum.

I have provided a positive means whereby the shoes 28, when in their disengaged positions, are drawn inwardly away from the friction drum so that friction at this time between the shoes and the drum is prevented. In order to accomplish this result, I have provided transverse keys 31 which extend across the cam faces adjacent to the end of each shoe, one-half of each key being embedded in the cam faces to which they are secured. The adjacent portion of each shoe 28 is provided with a slot 32 in which these keys extend, the slots being of such width that when the arms 23 are moved to disengage the friction shoes the sides of the slots 32 co-act with the keys 31 and draw the shoes down against the cams and away from the friction drum 18. Figure 2 illustrates this action. The movement of the arms oppositely to arrow 30 causes the shoes to move around the cam faces 27 thus causing clearance either between the shoes and the drum 18 or between the shoes and the cam faces 27. As the whole unit rotates in direct drive, this clearance would ordinarily occur between the shoes and the cam faces due to centrifugal force throwing the shoes outwardly against the drum. However, when in the released position the keys 31 hold one end of each shoe from following the movement of the arms 30 so that further movement of these arms draws the shoes down against the cam faces 27 against the centrifugal action due to rotation. Consequently, when in their released position the shoes cannot cling to the drum 18 by reason of an oil film congealing therebetween nor can these shoes cause any drag whatsoever against the drum to retard the free relative movement of the various parts of the transmission when the device is in neutral position.

Thus, at this time the drum is free to rotate in either direction independently of the shaft 13. This is the position in which the device is held when the reduced speeds of the transmission are engaged.

In order that the device may be conveniently operated the direction of the spiral splines 21 is such that moving the sleeve 22 forwardly releases the shoes and inversely, moving this sleeve rearwardly engages the shoes. I have provided around the sleeve 22 a manually shiftable collar 33 which is operable from the gear shift mechanism whereby the sleeve may be moved forwardly to release the clutch mechanism. I have also provided a helical spring 34 which extends between the flanges 20 and 25 which resiliently urges the sleeve to its rearward position to thereby engage the shoes when the collar 33 is not operated. Thus, when the collar 33 is inoperative the spring 34 moves the sleeve 22 rearwardly to engage the shoes 28 thus clutching the hub 17 with the driven shaft 13 and effecting a direct high speed drive for the transmission.

It will readily be seen that when the transmission is in this direct drive position, an overrunning movement of the driven shaft 13 in the direction shown by arrow 35 in Figure 2 tends to disengage the clutch by the withdrawing of the cams 27. The device then operates as an overrunning clutch inasmuch as practically no torque can be induced in the drum 18 through the clutch shoes 28 by movement in this direction. When the device is thus operating as an overrunning clutch the arms 23 do no more than resiliently urge the shoes against the cams 27 but, of course, with insufficient pressure to cause any appreciable gripping of the shoes against the friction drum, as very little friction against the friction drum is sufficient to overcome the action of the spring 34. However, when the friction drum 18 tends to overrun the driven shaft 13, then the friction between the shoes 28 and the drum 18 tends to force the shoes against the cams to cause a positive drive between the friction drum and the driven shaft 13.

Referring to Figure 6, an alternate structure is shown in which a compression spring 36 is inserted between the rear face of each cam and the opposite shoe, whereby the shoes may be resiliently urged into engagement. When such springs are used, the spring 34 may be dispensed with.

It will be noted that the periphery of the shoes 28 are machined to a slightly larger curvature than the interior of the friction drum 18 so that the initial engaging action between the drum and the shoes takes place at the extreme ends of the shoes. However, as the gripping action increases the shoes are distorted until their full peripheries engage the friction drum, this distortion occurring primarily because the cams force the intermediate portion of the shoes against the drum. This action provides an exceedingly smooth gripping action in the device which is much more desirable than that obtained by a conventional roller type overrunning clutch wherein only an instantaneous gripping action occurs.

Among the many advantages arising from the use of my improved device, it may be well to mention that I have provided an overrunning clutch which may be manually disengaged to allow the positive engagement of the intermediate and low speed ratios of the transmission. In this connection, an advantage is gained because the friction shoes when in their disengaged positions are positively drawn out of contact from the friction drum to thereby eliminate the friction which would otherwise occur between the shoes and drum. This feature allows the device to run freely in the neutral position so that the starting of the engine in extremely cold weather, when the transmission oil is likely to congeal, is accomplished very readily.

Still a further advantage is gained in that I am enabled to substitute an efficient and relatively inexpensive overrunning clutch mechanism in place of the conventional multiple disc clutch heretofore used in planetary transmissions, which overrunning clutch mechanism has all the requirements of the multiple disc clutch while at the same time incorporating the desirable feature of freewheeling without the addition of any further elements.

Still further, my arrangement eliminates the means required for holding the clutch in a positively engaged position against overrunning, so that the engine may be used as a brake, which means is required with the ordinary free-wheeling transmission.

Some changes may be made in the arrangement, construction and combination of the various parts of my improved device without departing from the spirit of my invention, and it is my intention to cover by my claims such changes as may be reasonably included within the scope thereof.

I claim as my invention:

1. In an overrunning clutch mechanism, a friction member forming one element thereof, a cam ring forming a second element thereof, said cam ring having a cam face formed thereon, a friction shoe disposed between said cam ring and friction member adapted to engage said friction member upon relative rotation in one direction of said cam face, means adapted to rotate relative to said cam ring which means are positively connected to one end of said shoe causing releasing movement of said shoe upon said cam face, and means connecting the other end of said shoe with said cam ring preventing further relative movement therebetween after the shoe has been rotated to its released position, whereby further movement of said shoe rotating means will draw said shoe into contact with the cam face and away from said friction member.

2. A device, as claimed in claim 1, wherein said means connecting the end of the shoe with the cam ring comprises a key fixed in one of said members, the friction shoe being slotted to render said key ineffective until the shoe has been rotated to its released position at which time said key coacts with one end of the slot to prevent further rotation of said shoe.

3. A device, as claimed in claim 1, wherein said means connecting the end of the shoe with the cam ring comprises a key fixed in said cam face, the adjacent portion of said shoe being slotted to render said key ineffective until the shoe has been rotated to its released position at which time said key coacts with one end of the slot to prevent further rotation of said shoe.

4. A device, as claimed in claim 1, wherein said friction member consists of a drum disposed around said shoe and cam ring.

5. A device, as claimed in claim 1, wherein the cam ring and friction shoe are provided with complementary arcuate surfaces whereby said shoe may oscillate around the center of said cam surface.

6. In an overrunning clutch mechanism, a pair of concentric ring members, one of said members having a cam surface thereon, a clutch shoe disposed between said cam member and the other of said ring members adapted to lock itself into engagement with said other member upon relative rotation on said cam surface, means adapted to rotate relative to both of said members and positively connected to one end of said shoe whereby said shoe may be rotated upon said cam face to its released position, and means connecting the other end of said shoe with said cam ring preventing further relative movement therebetween after the shoe has been rotated to its released position, whereby further movement of said shoe rotating means will draw the shoe into contact with the cam face and away from the other of said ring members.

EUGENE J. FARKAS.